United States Patent [19]
Hayashi et al.

[11] 3,730,486
[45] May 1, 1973

[54] HEAT EXCHANGING MIXER-REACTOR FOR HIGH VISCOSITY SUBSTANCES

[75] Inventors: Isao Hayashi, Kenichiro Kondo, both of Hiroshima, Japan

[73] Assignee: Mitsubishi Jukogyo Kabushiki Kaisha, Chuyoda-Ku-Tokyo, Japan

[22] Filed: Apr. 19, 1971

[21] Appl. No.: 135,117

[30] Foreign Application Priority Data

Apr. 27, 1970 Japan..........................4535685

[52] U.S. Cl...................259/6, 165/94, 259/DIG. 18
[51] Int. Cl. .....................B01f 7/10, B01f 15/06
[58] Field of Search...................259/6, 104, DIG. 18; 165/94

[56] References Cited

UNITED STATES PATENTS 2,589,350  3/1952  Edmunds..............................165/94
3,406,741  10/1968  Leach................................165/94 X
3,498,762  3/1970  Ven der Schee et al..............259/6 X

FOREIGN PATENTS OR APPLICATIONS 800,384  8/1958  Great Britain..........................259/6

Primary Examiner—Robert W. Jenkins
Assistant Examiner—Philip R. Coe
Attorney—Otto John Munz

[57] ABSTRACT

A heat exchanging mixer-reactor for high viscosity substances having two rotating shafts, each carrying a plurality of closely spaced agitating discs, arranged inside an inner casing through which the high viscosity substance is passed via oppositely located inlet and outlet openings; a jacket for the circulation of a heating or cooling medium formed by an outer casing surrounding the inner casing; wherein the agitating discs of one shaft overlap those of the other shaft and rotate in opposite directions, carrying on their periphery wiper fingers whose movements are coordinated with radial cutouts in the discs on the other shaft to avoid interference.

4 Claims, 4 Drawing Figures

PATENTED MAY 1 1973 3,730,486

INVENTORS
ISAO HAYASHI, KENICHIRO KONDO
BY
ATTORNEY

3,730,486

HEAT EXCHANGING MIXER-REACTOR FOR HIGH VISCOSITY SUBSTANCES

BACKGROUND OF THE INVENTION

1. Field of the Invention

The present invention relates to heat exchangers, and in particular to tank-type heat exchanging mixer-reactors for high viscosity substances which are suitable, for example, for the continuous mixing and reaction of chemical substances such as polymerizable compounds.

2. Description of the Prior Art

Tank-type heat exchangers or mixing reactors are known from the prior art in this field. These mixer-reactors may include rotating shafts carrying feed screws or the like, or agitating and wiping blades. The reactor tanks are arranged vertically or horizontally. In the prior art are further included horizontal tank-type heat exchangers which have one or two rotating shafts which carry a plurality of agitating discs.

In each case, the efficiency of heat exchange depends upon the degree to which mixing of the high viscosity substance is achieved inside the heat exchange tank. For mixer-reactors of very large volume the relationship between total heat exchange area and total capacity becomes increasingly less favorable unless the ratio L/D is also changed, meaning that a large tank has to be increased in length (L) rather than in diameter (D). This in turn affects unfavorably the mixing operation inside the tank, with the risk of leading to irregularities of temperature and to a lowering of the quality of the end product. The horizontal tank-type reactor with rotating discs, on the other hand achieves a high degree of mixing in the radial direction, but has the shortcoming that it tends to deposit a layer of reaction substance on the inside wall of the tank, with a consequent lowering of the heat transfer efficiency. Also, this reaction substance, if it remains inside the mixer-reactor longer than intended, may lead to partial pyrolysis and coloring of the product so as to reduce its quality.

SUMMARY OF THE INVENTION

It is an objective of the invention to provide a novel heat exchanging mixer-reactor for high viscosity substances in which the earlier-mentioned shortcomings are eliminated by combining the advantages of the prior art mixer-reactors of high heat exchange efficiency on the one hand, and of thorough radial mixing on the other hand. The invention therefore suggests a tank-type mixer-reactor which has an elongated inner casing, with reaction substance inlets and outlets on the casing; an outer casing surrounding the inner casing so as to form a jacket for a heating or cooling medium; plural rotary shafts extending through the inner casing, with a plurality of discs mounted on each shaft; each shaft rotating in the opposite direction to a parallel and adjacently rotating shaft, the outer diameter of the discs being larger than the center distance of adjacent shafts so as to create an overlap between oppositely rotating discs; the discs carrying at their periphery wiper fingers extending axially from the discs, the wiper fingers moving around the inside wall of the inner casing in light contact or slight clearance with the wall, the discs also having appropriate trochoid radial cutouts which permit the rotary motion of the wiper fingers of the discs of an adjacent shaft without interference.

BRIEF DESCRIPTION OF THE DRAWINGS

Further special features and advantages of the invention will become apparent from the description following below, when taken together with the accompanying drawing which illustrates, by way of example, several embodiments of the invention, represented in the various figures as follows.

DESCRIPTION OF THE PREFERRED EMBODIMENTS

Figure 1:
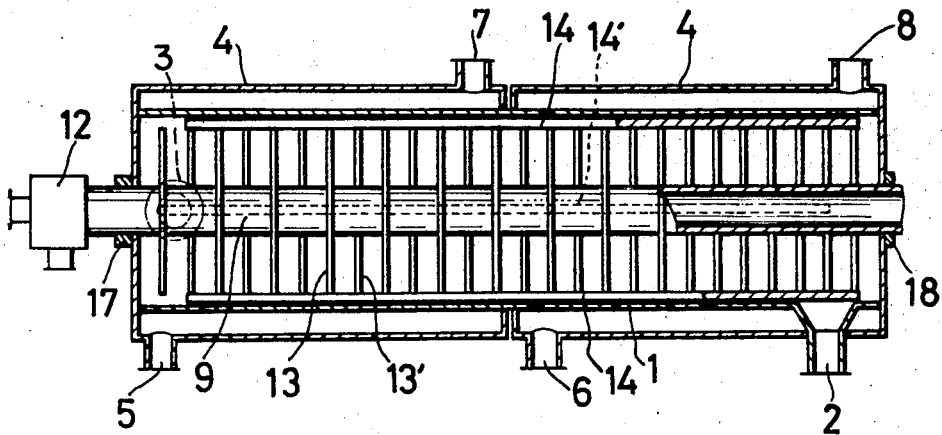
FIG. 1 is a partially schematic longitudinal cross section through a heat exchanging mixer-reactor embodying the invention.
Figure 2:
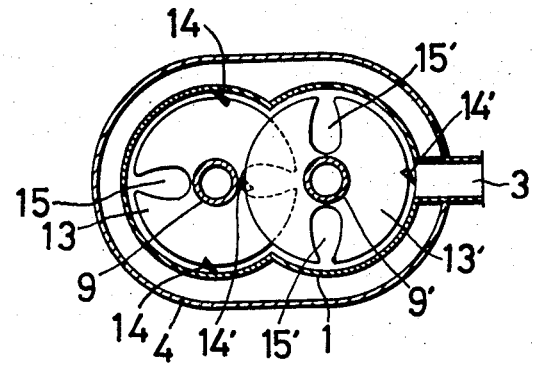
FIG. 2 is a radial cross section through the mixer-reactor of FIG. 1.
Figure 4:
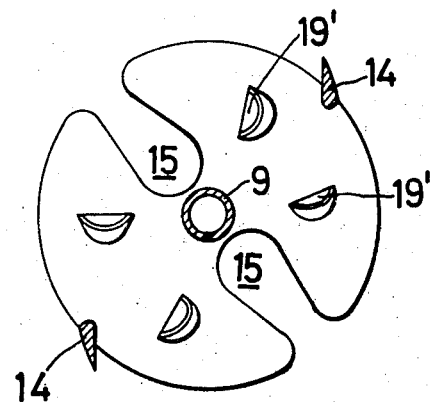
FIG. 4 is a similar enlarged side view of a modified version of a rotating disc.

FIGS. 1 and 2 of the drawings show a heat exchanging mixer-reactor whose inner casing 1 has an outlet 2 and an inlet 3 for the reaction substance on opposite axial ends of the casing. An outer casing 4 surrounds the inner casing 3 so as to form a heat exchanging jacket for a cooling or heating medium. The heat exchange medium enters casing 4 through inlets 5 and 6 and leaves it through outlets 7 and 8. A hollow shaft 9 extends longitudinally through the inner casing 1, being rotatably supported in the end walls of the casing by bearings 17 and 18. A second hollow shaft 9' extends similarly through casing 1, at a distance from and parallel to shaft 9. Through the bores of shafts 9 and 9' is circulated a cooling or heating medium which flows into and out of the shafts through rotary joints outside the casing, as illustrated schematically at 12. The shafts 9 and 9' carry a plurality of discs 13 and 13', respectively, which are axially apertured, the discs being either of wire mesh, or provided with slits or openings in the manner of a spoked wheel. The plural discs 13 and 13' are fixedly mounted on shafts 9 and 9', overlapping each other, because the diameter of the discs is larger than the center distance between shafts 9 and 9'. This makes it necessary that the discs 13 of shaft 9 alternate in axial succession with the discs 13' of shaft 9'. On their outer periphery the discs 13 and 13' carry wiper fingers 14 (FIGS. 4 and 5). The rotating wiper fingers 14 serve to agitate the treatment liquid inside casing 1 and also serve to prevent the formation of deposits on the inner wall of casing 1. For this purpose, the rotating fingers 14 and the casing wall cooperate to create a light contact or a small clearance between them. The two shafts 9 and 9' rotate at the same speed and in opposite directions. In order to permit rotation of the wiper fingers 14 through the overlap region between the discs 13 and 13', the discs have appropriate radial cutouts 15 into which the fingers 14 of adjacent opposite discs move during their rotation through the overlap region. This arrangement makes possible a close spacing of the discs without mutual interference by their wiper fingers 14. The shape of the cutouts 15 is preferably trochoid. The embodiment shown in the drawing features two shafts, but it should be understood that other embodiments may have three or more such shafts which are so arranged that adjacent shafts rotate at the same speed and in opposite direction to one another. Here too, the discs must have radial cutouts to permit the rotation of the wiper fingers of opposite discs through the overlap region without interference. The optimal number and spacing of the discs and the number of wiper fingers on each disc is determined by the type of substance to be treated and the size of the apparatus.

Figure 3:
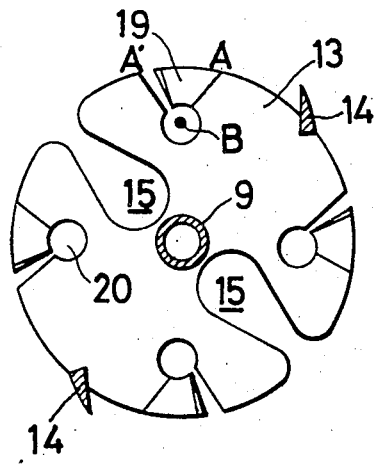
FIG. 3 is an enlarged side view of a rotating disc for the mixer-reactor of the invention.

During operation of the apparatus of the invention as described above, a reacting substance is pumped into casing 1 via inlet 3, mixed and agitated by the discs 13 and fingers 14 which rotate inside casing 1, leaving casing 1 through outlet 2. Heat transfer is accomplished by either a cooling or heating medium which enters through the inlets 5 and 6 into the jacket between casings 1 and 4, leaving through the outlets 7 and 8. Another cooling or heating medium may be circulated through the central bores of shafts 9 and 9', via the rotary joint 12. The discs 13 of one embodiment of the invention have additional radial kerfs between points A' and B (FIG. 3) terminating at the periphery of the disc, with the adjoining disc portion being bent at a lateral angle along another line A-B to form an agitator blade 19. Comparable kerfs may be arranged at a distance inside the disc periphery to form bent-out agitator blades 19', as shown in FIG. 4. The circular cutout 20 around point B (FIG. 3) not only facilitates the bending of blade 19, it also contributes to the agitation and mixing of the reaction mixture.

In the apparatus as described the reaction temperature is controlled by the heat exchange medium flowing through the jacket between casings 1 and 4. However, a desired cooling effect may be augmented by means of a feed liquid which is admixed to the reaction mixture passing through casing 1, the feed liquid of low boiling point being evaporated from the product after it leaves the mixer-reactor and, following cooling, is recirculated through casing 1.

The apparatus suggested by the invention eliminates the formation of deposits of reaction substance on the wall of the inner casing 1, thereby improving the heat transfer across this wall, while creating a homogeneous and rapid radial mixing action, as the reaction substance advances in the axial direction, with high volumetric efficiency, in the manner of a flow-through mixing reactor. Simultaneously, the rotating discs serve as barriers against reverse mixing in the axial direction, which feature would permit the apparatus to be used in both the full and semi-full modes of operation, the heat transfer efficiency being higher in the full mode.

Thus, the apparatus of the invention combines the advantages of a thorough mixing action and good heat transfer, being suitable for the continuous reaction of a variety of high viscosity substance, such as, for example, the continuous polymerization condensation of polyesters, the continuous polymerization of polyolefines, or other heat exchange reactions involving high viscosity substances.

We claim:

1. A heat exchanging mixer-reactor for the continuous treatment of high viscosity substances comprising in combination:
   an elongated inner casing with an inlet and outlet for a reaction substance;
   an outer casing surrounding the inner casing to form a jacket for a heat exchange medium, including an inlet and outlet for said medium;
   at least two parallel spaced shafts extending longitudinally through the inner casing, the shafts being rotatably supported in the end walls of one of the casings and rotating at the same speed, but in opposite directions;
   a plurality of discs mounted at regular axial spacing intervals on each shaft, the discs having a diameter which is larger than the center distance between two adjacent parallel shafts so as to create an overlap between discs mounted thereon, the discs of adjacent shafts alternating in axial succession;
   axially extending wiper fingers on the outer periphery of the discs, the relative location of the inner wall of the inner casing to the path of the wiper fingers being such that their clearance is slight to zero; and
   radial cutouts in the discs which are shaped and angularly positioned in such a way as to permit movement of the wiper fingers through the overlap region of the discs without interference with the discs on an adjacent shaft.

2. An apparatus as defined in claim 1, wherein the shafts have longitudinal center bores for the circulation of a heat exchange medium therethrough.

3. An apparatus as defined in claim 1, wherein the discs include laterally projecting agitating blades.

4. An apparatus as defined in claim 3, wherein the discs are sheet metal stampings, the agitating blades being laterally bent wall portions partially surrounded by kerfs.

* * * * *